(12) United States Patent
Ren

(10) Patent No.: US 12,655,042 B2
(45) Date of Patent: Jun. 16, 2026

(54) WATER PURIFICATION BOTTLE

(71) Applicant: Yi Ren, Hengshui (CN)

(72) Inventor: Yi Ren, Hengshui (CN)

(*) Notice: Subject to any disclaimer, the term of this patent is extended or adjusted under 35 U.S.C. 154(b) by 0 days.

(21) Appl. No.: 19/328,079

(22) Filed: Sep. 12, 2025

(65) Prior Publication Data

US 2026/0008701 A1 Jan. 8, 2026

(51) Int. Cl.
*C02F 1/44* (2023.01)
*C02F 1/00* (2023.01)
*C02F 1/28* (2023.01)

(52) U.S. Cl.
CPC .............. *C02F 1/444* (2013.01); *C02F 1/003* (2013.01); *C02F 1/283* (2013.01); *C02F 2201/004* (2013.01); *C02F 2201/005* (2013.01); *C02F 2201/007* (2013.01); *C02F 2307/02* (2013.01)

(58) Field of Classification Search
None
See application file for complete search history.

(56) References Cited

U.S. PATENT DOCUMENTS

| | | | | |
|---|---|---|---|---|
| 4,037,477 A | * | 7/1977 | Niskin | G01N 1/12 |
| | | | | 73/300 |
| 2005/0087260 A1 | * | 4/2005 | Marszalec | C02F 9/20 |
| | | | | 141/286 |
| 2017/0042373 A1 | * | 2/2017 | Alexander | A47J 31/4425 |
| 2020/0079658 A1 | * | 3/2020 | Weber | B01D 35/30 |
| 2024/0262714 A1 | * | 8/2024 | Weitz | B01D 39/2082 |

FOREIGN PATENT DOCUMENTS

CN 113880324 A * 1/2022 .............. A45F 3/16

OTHER PUBLICATIONS

Machine translation of CN-113880324-A, pp. 1-4. (Year: 2022).*

* cited by examiner

*Primary Examiner* — Clare M Perrin
(74) *Attorney, Agent, or Firm* — All West Law Group PLLC; Aaron Powell

(57) ABSTRACT

A water purification bottle includes an inner bottle body and an outer bottle body, wherein a filter unit is detachably arranged at the bottom end of the inner bottle body; a periphery of the inner bottle body is actively matched with an inner perimeter of the outer bottle body; when the outer bottle body is filled with a mixture of liquid and solid, only the liquid of the mixture runs through the filter unit, and flows into the inner bottle body.

9 Claims, 8 Drawing Sheets

WATER PURIFICATION BOTTLE

TECHNICAL FIELD

The present invention belongs to the technical field of water bottle and particularly relates to a water purification bottle.

TECHNICAL BACKGROUND

Nowadays, most existing water purification bottles usually adopt a nested structure of an inner and an outer bottle, and a core purification component thereof is a filter unit arranged at the bottom of the inner bottle body. The inner bottle body is inserted into the outer bottle body in actual uses; the out bottle is filled with water, which is purified by the filter unit, and then flows into the inner bottle; such a design meets the demand for instant water purification to some extent.

However, the filter unit of the existing water purification bottle is fixedly connected to or integrally formed at the bottom of the inner bottle. As a result, the filter unit cannot be detachable. After a long-term use, the filter unit accumulates impurities causing blockage and poor purification effect. Since the filter unit is fixedly connected to or integrally formed at the bottom of the inner bottle, it is hard for users to thoroughly clean the filter unit; and those residual impurities and moisture may become a warm bed for bacteria breeding, which not only reduces the safety of the purified water quality, but also poses a potential threat to the health of the users; meanwhile, the longevity of the water purification bottle is shortened. Obviously, the existing water purification bottle fails to meet requirements such as water purification and durability of the water purification bottle.

Invention Content

In order to overcome the shortcomings of the prior art, the present invention provides a water purification bottle, which is convenient for users to replace a filter unit.

The technical solution adopted by the present invention to solve the technical problem is:

A water purification bottle, comprises an inner bottle body and an outer bottle body, wherein a filter unit is detachably arranged at a bottom end of the inner bottle body; a periphery of the inner bottle body is actively matched with an inner perimeter of the outer bottle body; when the outer bottle body is filled with a mixture of liquid and solid, only the liquid of the mixture runs through the filter unit; and then flows into the inner bottle body.

Further, the filter unit comprises a barrel structure and a filter component arranged inside the barrel structure; the barrel structure further comprises a proximal end and a distal end; an outer wall of the proximal end is embedded with a first sealing ring; an outer wall of the distal end is embedded with a second sealing ring; an outer diameter of the distal end is smaller than that of the proximal end.

Further, the outer wall of the distal end is provided with at least two block pieces; the bottom end of the inner bottle body is provided with a groove; the filter unit is detachably connected at the bottom end of the inner bottle body via the groove and the two block pieces.

Further, the filter component comprises a primary filter component and a secondary filter component; the primary filter component is located on the proximal end; the secondary filter component is located on the distal end; the primary filter component and the secondary filter component are arranged at intervals forming a filter cavity inside the barrel structure.

Further, the primary filter component comprises a primary ultrafiltration membrane, a carbon fiber and a primary filter cotton; the carbon fiber is arranged between the primary ultrafiltration membrane and the primary filter cotton.

Further, the secondary filter component comprises a secondary ultrafiltration membrane and a secondary filter cotton; the secondary ultrafiltration membrane is arranged below the secondary filter cotton.

Further, a proximal strainer is arranged on the proximal end of the barrel structure; a distal strainer is arranged below the distal end of the barrel structure; the primary filter component and the secondary filter component are arranged between the proximal strainer and the distal strainer; the proximal end and the distal end of the barrel structure are respectively provided with an annular groove; an outer periphery of the proximal strainer and distal strainer is provided with an annular protrusion respectively; the annular protrusion can embed into the annular groove.

Further, at least one venthole is arranged at the bottom end of the outer bottle body; a valve stem is arranged inside the venthole; the venthole and the valve stem together work as a one-way valve; outside air flows into the outer bottle body through the venthole.

Further, the water purification bottle further comprises a bottle cap component and a sealing gasket; the bottle cap component is arranged on a top end of the inner bottle body; the sealing gasket is sleeved around an outer periphery of the inner bottle body; when the inner bottle body is inserted into the outer bottle body, the sealing gasket is located between the bottle cap component and an top end of the outer bottle body.

Further, the bottle cap component comprises a bottle cap body and a flip-up lid; the bottle cap body is provided with a drinking mouth in communication with the inner bottle body; the flip-up lid is hinged to bottle the cap body; the flip-up lid is rotatable relative to the bottle cap body to close or open the drinking mouth; a magnetic piece is embedded inside the bottle cap body; a metal piece or magnetic piece is embedded in the flip-up lid; the flip-up lid is attached to the bottle cap body due to an ferromagnetic attraction force when the flip-up lid turns over.

The beneficial effects of the present invention are:

First, a filter unit is detachably connected at the bottom end of an inner bottle body via a groove and two block pieces; protrusions on the block pieces, slots and partitions inside the groove together form a limiting structure, which not only prevents the filter unit loosening or falling off the inner bottle body in use, but also achieves effects of quick installation and disassembly by means of clockwise and anticlockwise rotation; the filter unit can be easily replaced when it is blocked or used for some time, which can reduce maintenance costs.

Second, the water purification bottle adopts a dual filter components; the primary filter component comprises a primary filter cotton, a carbon fiber and a primary ultrafiltration membrane; the secondary filter component comprises a secondary ultrafiltration membrane and a secondary filter cotton; the dual filter components perform fine filtration by intercepting large particle impurities in sequence and adsorb pollutants; the dual filter components effectively remove solid impurities and ensure that water quality is pure after filtration; it improves filtration reliability.

Third, the flip-up lid is attached to the bottle cap body due to an ferromagnetic attraction force, which can remain in a stable open state when the flip-up is turnover; it is convenient for a user to continuously drink or pour without a manual support, thereby improving the convenience of one-handed operation.

DESCRIPTION OF MARKS IN FIGURES

1—inner bottle body; 11—groove; 12—left slot; 13—right slot; 14—partition; 15—sealing gasket; 2—outer bottle body; 21—venthole; 22—valve stem; 3—filter unit; 31—barrel structure; 310—segmented strainer; 311—proximal end; 3111—first sealing ring; 3112—proximal strainer; 312—distal end; 3121—second sealing ring; 3122—block piece; 3123—protrusion; 3224—distal strainer; 32—filter component; 321—primary filter component; 3211—primary ultrafiltration membrane; 3212—carbon fiber; 3213—primary filter cotton; 322—secondary filter component; 3221—secondary ultrafiltration membrane; 3222—secondary filter cotton; 33—filter cavity; 34—annular groove; 35—annular protrusion;

4—bottle cap component; 41—bottle cap body; 411—magnetic piece; 42—flip-up lid; 43—drinking mouth

DETAILED DESCRIPTION OF THE EMBODIMENTS

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

The present invention provides a water purification bottle that is convenient for the users to remove and replace its filter unit, so as to improve the convenience and use experience.

Figure 1:
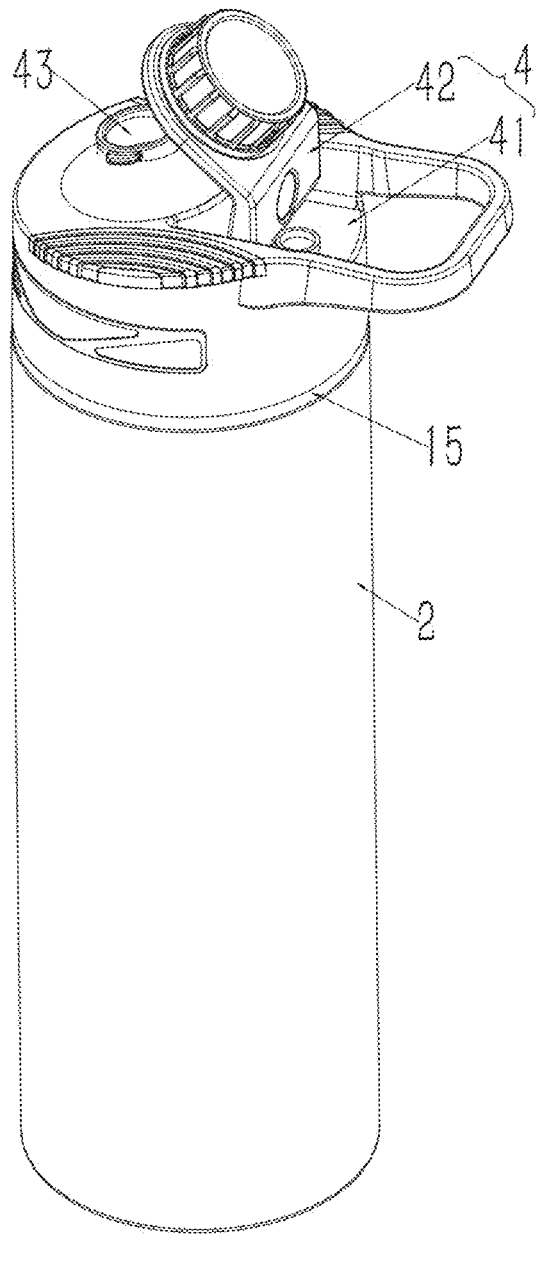
FIG. 1 is a schematic diagram of a water purification bottle of the present invention.
Figure 2:
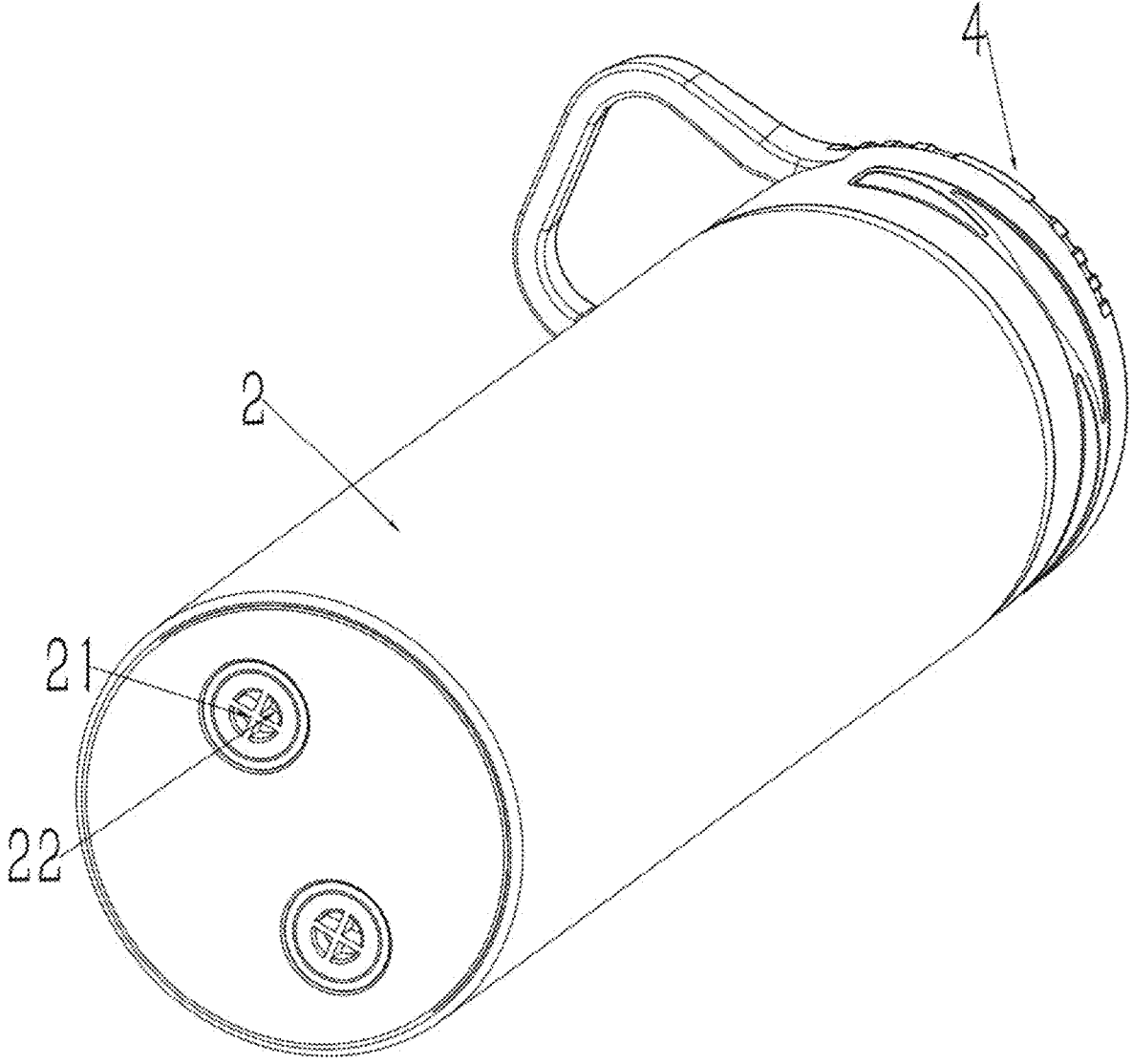
FIG. 2 is a schematic diagram of the water purification bottle from a bottom angle.
Figure 3:
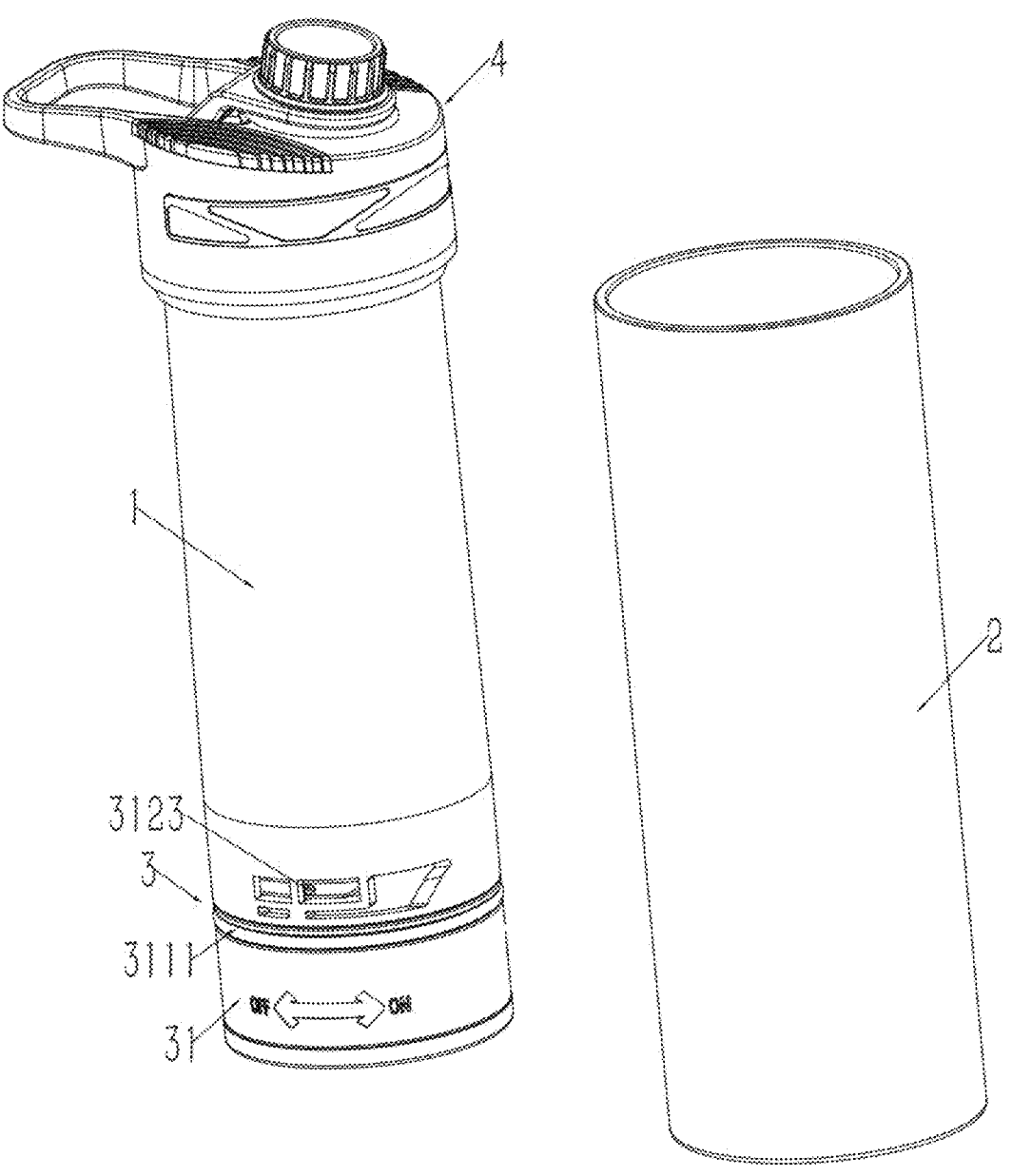
FIG. 3 is an exploded view of the inner bottle body and the outer bottle body of the water purification bottle.
Figure 4:
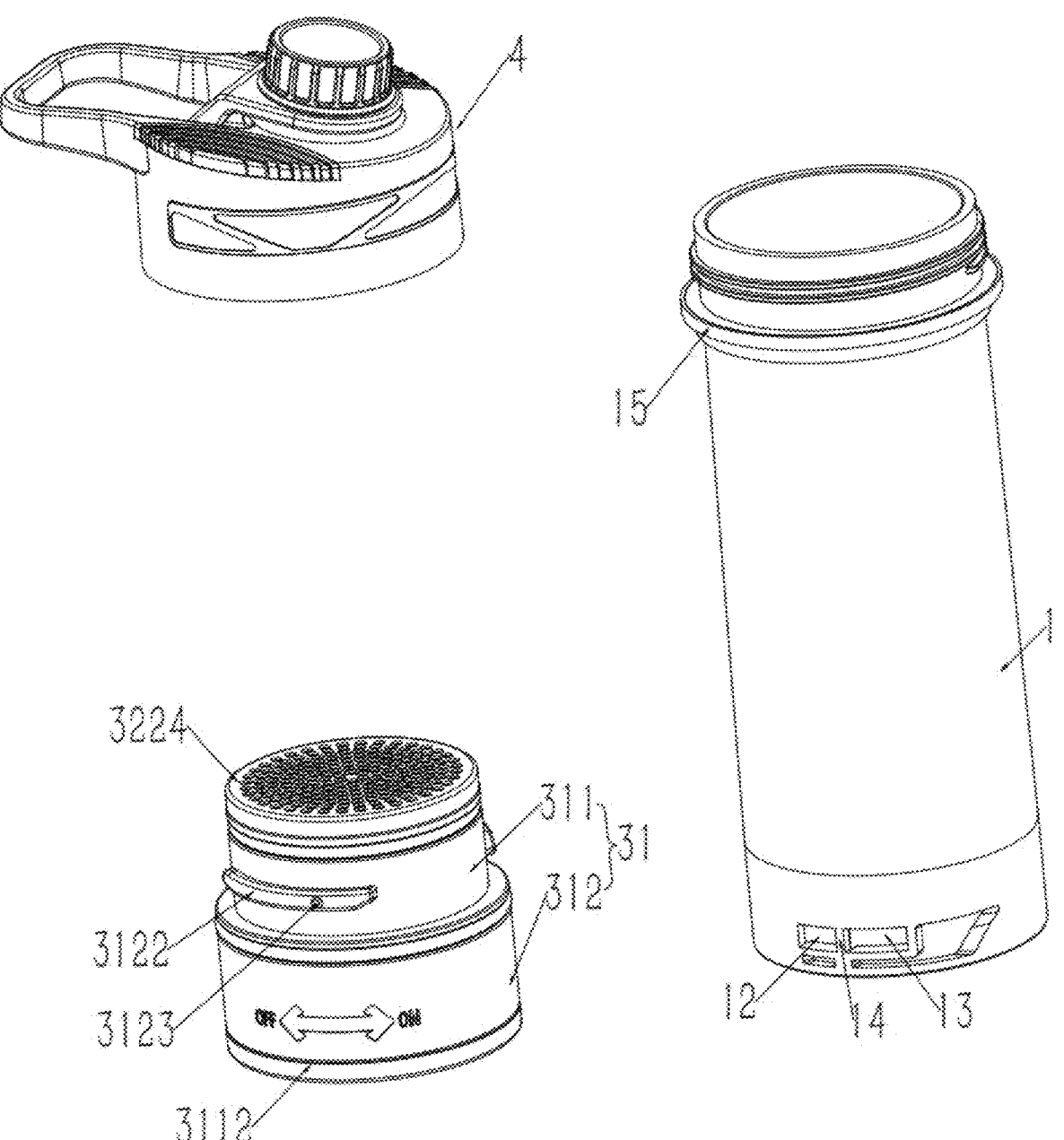
FIG. 4 is an exploded view of the inner bottle body, a filter unit and bottle cap component.
Figure 5:
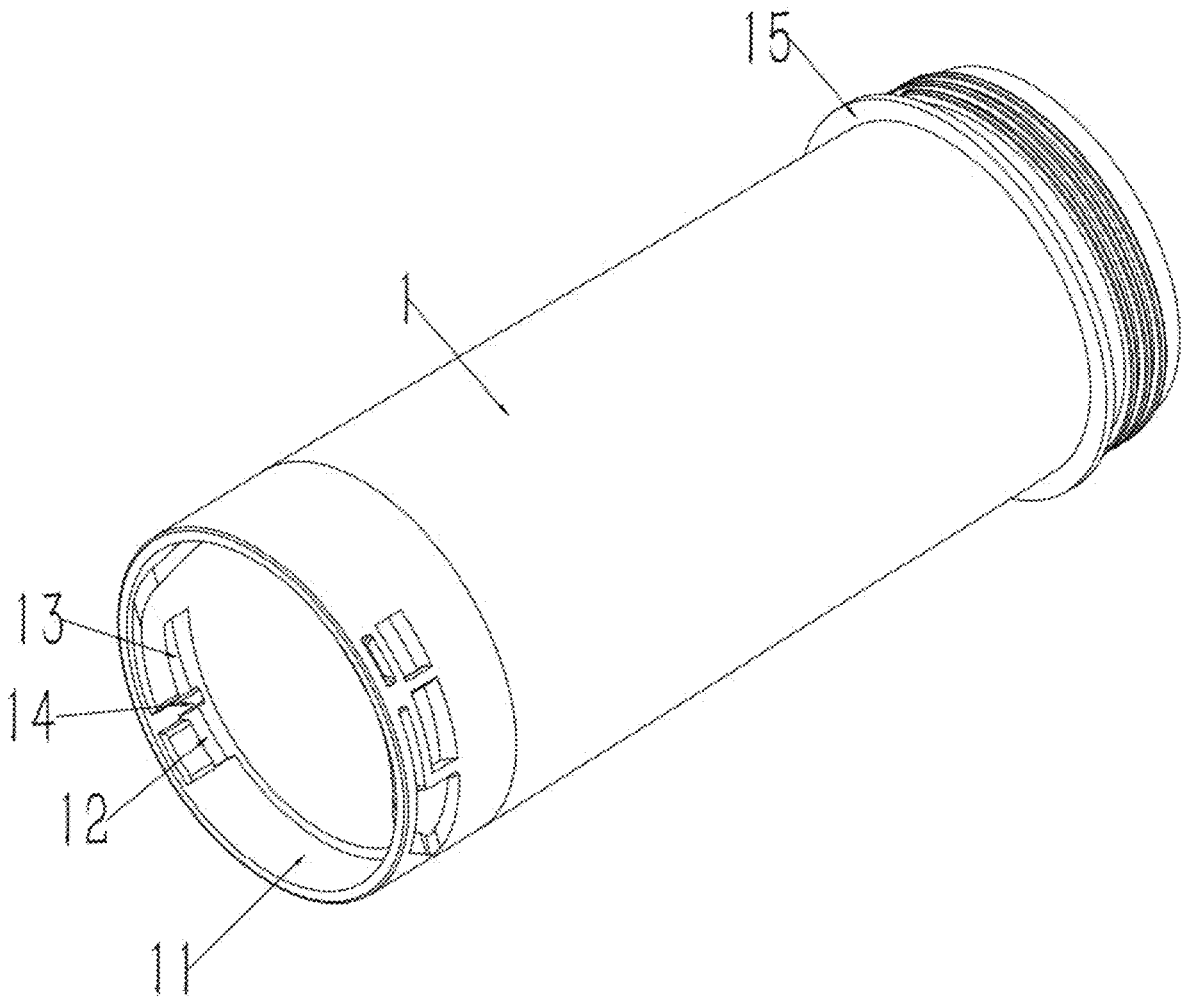
FIG. 5 is a schematic diagram of the inner bottle body.
Figure 6:
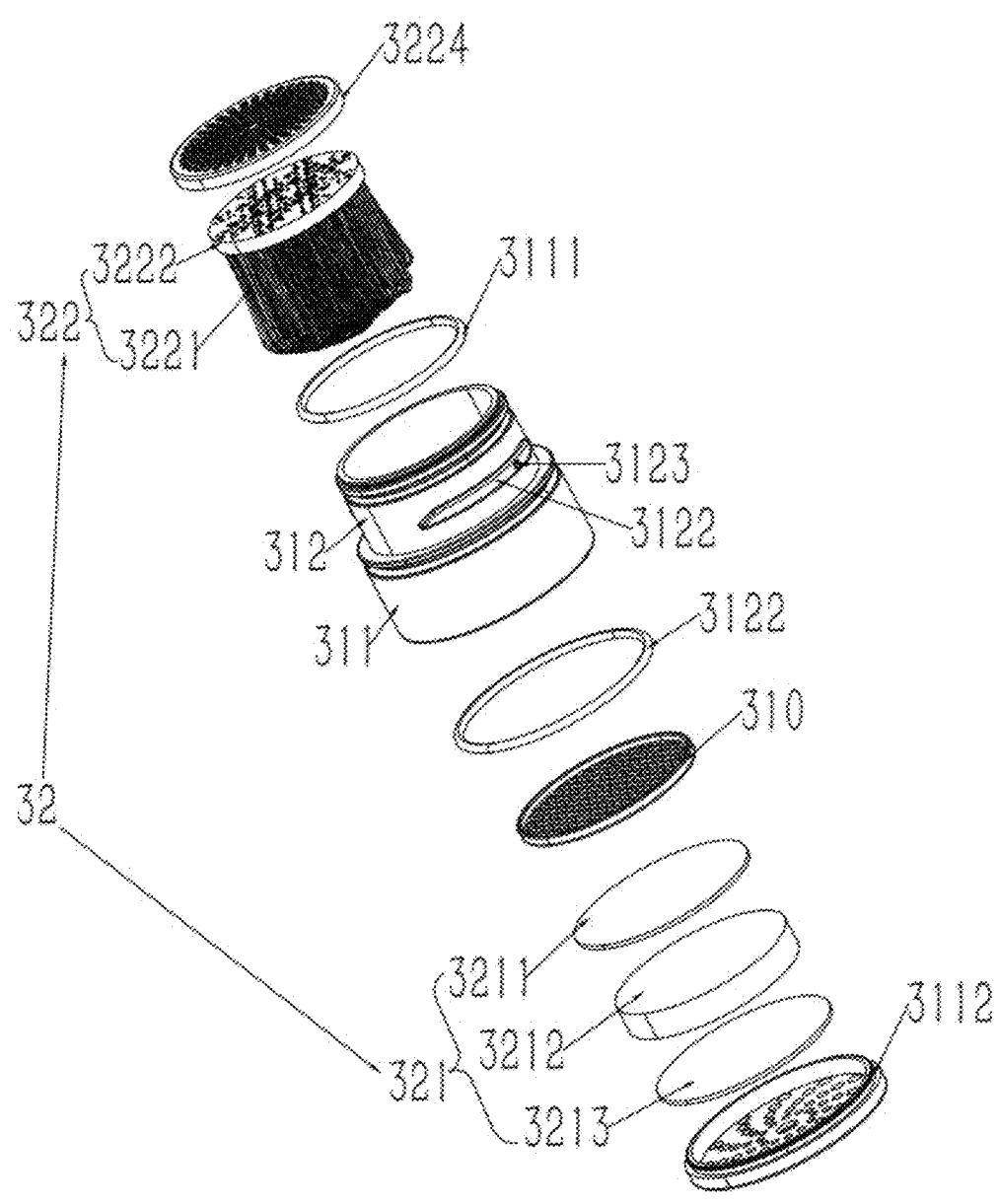
FIG. 6 is an exploded view of the filter unit.
Figure 7:
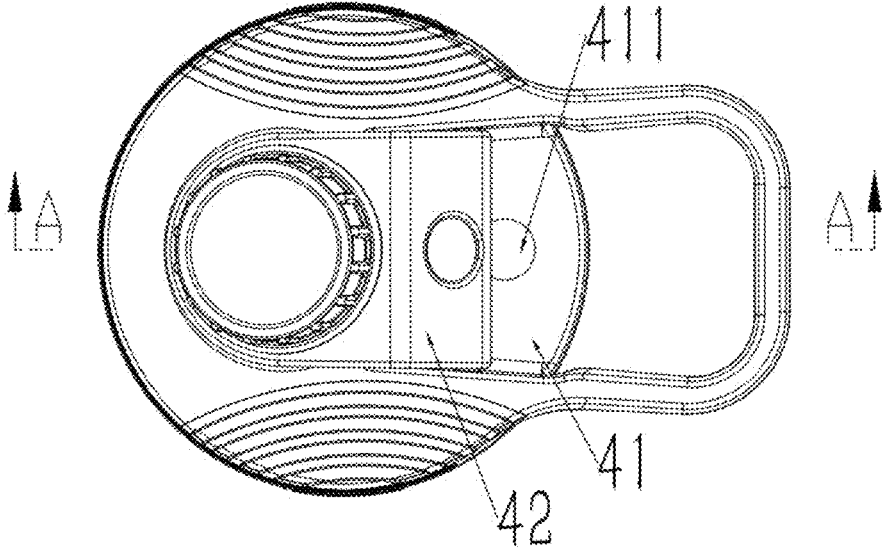
FIG. 7 is a top view of the water purification bottle.
Figure 8:
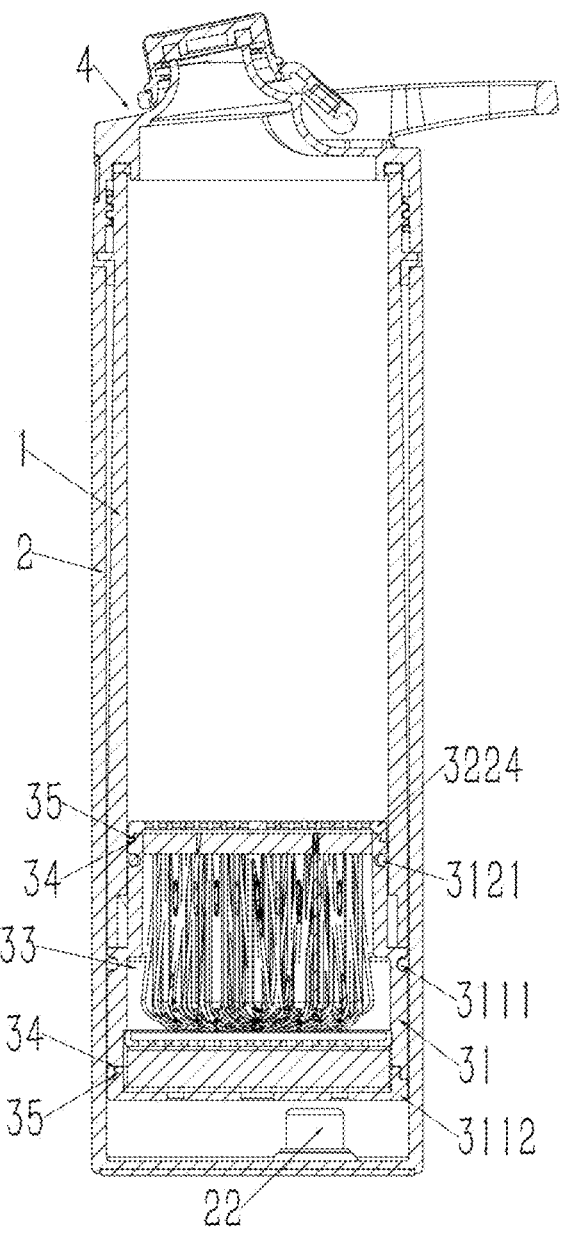
FIG. 8 is a section view along line A-A in FIG. 7.

Referring to FIGS. 1 to 8, the water purification bottle provided in this embodiment includes an inner bottle body 1 and an outer bottle body 2, wherein a filter unit 3 is detachably arranged at the bottom end of the inner bottle body 1; a periphery of the inner bottle body 1 is actively matched with an inner perimeter of the outer bottle body 2; when the outer bottle body 2 is filled with a mixture of liquid and solid, only the liquid of the mixture runs through the filter unit 3, and then flows into the inner bottle body 1.

Wherein, both the inner bottle body 1 and the outer bottle body 2 are made of food-grade materials; the inner bottle body 1 is a hollow columnar structure with openings at two ends; the periphery of the inner bottle body 1 is actively matched with the inner perimeter of the outer bottle body 2;

an interval between the inner bottle body 1 and the outer bottle body 2 is within 2 millimeters so as to ensure that the inner bottle body 1 is closely and fitly matched with the outer bottle body 2 when the inner bottle body 1 inserts into the outer bottle body 2; an overall height of the outer bottle body 2 is slightly lower than that of the inner bottle body 1; when the inner bottle body 1 is completely inserted into the outer bottle body 2, an edge on the top end of the inner bottle body 1 is around 5 to 8 centimeters higher than the top edge of the outer bottle body 2, so as to make it convenient for the users to hold on the water purification bottle.

The filter unit 3 comprises a barrel structure 31 and a filter component 32 arranged inside the barrel structure 31; the barrel structure 31 further comprises a proximal end 311 and a distal end 312; an outer wall of the proximal is embedded with a first sealing ring 3111; an outer wall of the distal end 312 is embedded with a second sealing ring 3121; an outer diameter of the distal end 312 is smaller than that of the proximal end 311; the periphery of the inner bottle body 1 is actively matched with the inner perimeter of the outer bottle body 2; the filter unit 3 is detachably connected at the bottom end of the inner bottle body 1. In use, the first sealing ring 3111 and the second sealing ring 3121 can seal radially, which prevents leakage of unfiltered liquid, and ensures that the liquid inside of the barrel structure 31 first runs through the filter component 32 and then flows into the inner bottle body 1.

The outer wall of the distal end 312 is provided with at least two block pieces 3122; the bottom end of the inner bottle body 1 is provided with a groove 11; the filter unit 3 is detachably connected with the inner bottle body 1 via the groove 11 and the two block pieces 3122. Specifically, the two block pieces 3122 of the distal end 312 is inserted into the inner bottle body 1 along the groove 11; taking the inner bottle body 1 as a reference, the barrel structure 31 is rotated clockwise to tighten, thereby the inner bottle body 1 can detachably connect with the filter unit 3.

Protrusion 3123 is arranged on the surface of each block piece 3122; the two sides of the groove 11 are respectively provided with a left slot 12, a right slot 13, and a partition 14; partition 14 is located between the left slot 12 and the right slot 13. In this embodiment, the distal end 312 is inserted into the groove 11, and the proximal end 311 is rotated clockwise so that the protrusions 3123 pass through the left slot 12 and the partition 14 in sequence; the protrusions 3123 go through the right slot 13.

The protrusions 3123 work together with the left slot 12, the right slot 13 and the partition 14 forming a limiting structure to prevent the filter component 3 loosening or falling off from the inner bottle body 1 in use; when the users need to remove the filter unit 3, they rotate the barrel structure 31 anticlockwise to allow the protrusions 3123 to go through the right slot 13, the partition 14, and the left slot 12 in reverse, and then the filter unit 3 is removed from the inner bottle body 1. Thus, the filter unit 3 of this embodiment offers benefits of quick disassembly and installation. It is easy and convenient for the users to have filter unit 3 replaced when it is blocked or used for some time. In this way, the users just need to replace the filter unit 3 without buying a new water purification bottle, as a result, it saves replacement cost and ensures a continued high-efficiency filtering performance of the water purification bottle.

The filter component 32 comprises a primary filter component 321 and a secondary filter component 322; the primary filter component 321 is located on the proximal end 3111; the secondary filter component 322 is located on the distal end 3121; the primary filter component 321 and the secondary filter component 322 are arranged at intervals forming a filter cavity 33 inside the barrel structure 31. Specifically, a proximal strainer 3112 is arranged on the proximal end 3111 of the barrel structure 31; a distal strainer 3224 is arranged below the distal end 3121 of the barrel structure 31; the primary filter component 321 and the secondary filter component 322 are arranged between the proximal strainer 3112 and the distal strainer 3224; in addition, a segmented strainer 310 is also arranged between the primary filter component 321 and the secondary filter component 322 to prevent entanglement, thereby avoiding clogging of the filter cavity 33.

The primary filter component 321 comprises a primary filter cotton 3213, a carbon fiber 3212, and a primary ultrafiltration membrane 3211, which are arranged from bottom to top in sequence; the carbon fiber 3212 is arranged between the primary ultrafiltration membrane 3211 and the primary filter cotton 3213. It should be noted that the ultrafiltration membrane is a hollow fiber ultrafiltration membrane ("UF membrane"), which is hollow and thin tubular with 0.01-0.1 micron micropores on its surface; thanks to the thin tubular shape of the primary ultrafiltration membrane 3211, it has advantages of a high-specific surface area, low energy consumption, strong pollution resistance and a compact structure.

As the embodiment of the present invention, the primary filter cotton 3213 adopts a Poly-Propylene cotton (hereafter "PP cotton"); as an efficient pre-filter layer, PP cotton has the characteristics of high filtration accuracy and low water flow resistance; it can effectively intercept large particles of impurities, protect subsequent filter materials and ensure stable water output.

The secondary filtration component 322 comprises a secondary ultrafiltration membrane 3221 and a secondary filter cotton 3222; the secondary ultrafiltration membrane 3221 is arranged below the secondary filter cotton 3222.

The mixture in the outer bottle body 2 passes through the primary filter component 321, the filter cavity 33, and the secondary filter component 322 in sequence before entering the inner bottle body 1. The dual filter components can achieve optimal filtering effects, effectively remove solid impurities; ensure the purity of the water in the inner bottle body 1. The purification water bottle provides users with purity water conveniently at any time.

The proximal end 311 and the distal end 312 of the barrel structure 31 are respectively provided with an annular groove 34; an outer periphery of the proximal strainer 3112 and the distal strainer 3224 is respectively provided with an annular protrusion 35; the proximal strainer 3112 and the distal strainer 3224 are respectively connected to two ends of the barrel structure 31 by embedding the annular protrusions 35 into the annular grooves 34.

The existing water purification bottles on the market bring troubles for users to pull out the inner bottle body 1 from the outer bottle body 2 when they finish the water, for there is a vacuum negative pressure formed between the inner bottle body 1 and the outer bottle body 2.

In order to solve this technical problem, at least a venthole 21 is arranged at the bottom end of the outer bottle body 2; a valve stem 22 is arranged in the venthole 21; the valve stem 22 and venthole 21 together constitute a one-way valve, only allowing outside air to flow into the outer bottle body 2 through the venthole 21. The one-way valve prevents liquids inside the outer bottle body 2 flow out reversely. When the user needs to take the inner bottle body 1 out of the outer bottle body 2, he or she can easily pull the inner bottle body 1 upward to remove it because outside air quickly flows into the outer bottle body 2 through the one-way valve, and the pressure inside the outer bottle body 2 is the same as that of the outside. No vacuum state inside the outer bottle body 2, it allows the inner bottle body 1 being removed easily and smoothly.

The water purification bottle further comprises a bottle cap component 4 and a sealing gasket 15; the bottle cap component 4 is arranged on the top end of the inner bottle body 1; the sealing gasket 15 is sleeved around the outer periphery of the inner bottle body 1; when the inner bottle body 1 is inserted into the outer bottle body 2, the sealing gasket 15 is located between the bottle cap component 4 and the top end of the outer bottle body 2. During repeated insertion and removal of the inner bottle body 1, the sealing gasket 15 can absorb and disperse the contact impulse force and friction between the bottle cap component 4 and the top end of the outer bottle body 2, effectively reducing abrasion and preventing the bottle cap component 4 from loosening.

The bottle cap component 4 comprises a bottle cap body 41 and a flip-up lid 42; the bottle cap body 41 is provided with a drinking mouth 43 to communicate with the inner bottle body 1; the flip-up lid 42 is hinged to the bottle cap body 41 and can rotate relative to the bottle cap body 41 to close or turn over the drinking mouth 43.

In this embodiment, a magnetic piece 411 is embedded inside the bottle cover body 41; a metal piece or another magnetic piece 411 is embedded in the flip-up lid 42; the flip-up lid 42 is attached to the bottle cover body 41 in open state due to an ferromagnetic attraction force, thus, the drinking mouth 43 remains in a stable open state; it is convenient for users to continuously drink or pour water without supporting the flip-up lid 42 manually, thereby improving the convenience of one-handed operation.

In summary, the water purification bottle in the present application has a detachable filter unit 3, which allows users to quickly replace the filter unit 3 after using for some time; the process of removing the inner bottle body 1 is smooth and labor-saving; it has good usability and durability.

It could be understood that under the guidance of the above embodiments, those skilled in the art can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the scope of protection of the present invention.

The invention claimed is:

1. A water purification bottle, comprising an inner bottle body and an outer bottle body, wherein a filter unit is detachably arranged at a bottom end of the inner bottle body; a periphery of the inner bottle body is actively matched with an inner perimeter of the outer bottle body; when the outer bottle body is filled with a mixture of liquid and solid, only the liquid of the mixture runs through the filter unit, and then flows into the inner bottle body; the filter unit comprises a barrel structure; the barrel structure further comprises a proximal end and a distal end; an outer wall of the distal end is provided with at least two block pieces; the bottom end of the inner bottle body is provided with a groove; the filter unit is detachably connected at the bottom end of the inner bottle body via the groove and the at least two block pieces; a protrusion is arranged on a surface of each of the at least two block pieces; two sides of the groove are respectively provided with a left slot, a right slot, and a partition; the partition is located between the left slot and the right slot; the distal end is inserted into the groove, and the proximal end is rotated clockwise so that the protrusion passes through the left slot and the partition in sequence; the protrusion goes through the right slot; the water purification bottle further comprises a bottle cap component; the bottle cap component comprises a bottle cap body and a flip-up lid; the flip-up lid is hinged to the bottle cap body; a metal piece or magnetic piece is embedded in the flip-up lid; the flip-up lid is attached to the bottle cap body due to a ferromagnetic attraction force when the flip-up lid is turned over.

2. The water purification bottle according to claim 1, wherein the filter unit further comprises a filter component arranged inside the barrel structure; an outer wall of the proximal end is embedded with a first sealing ring; the outer wall of the distal end is embedded with a second sealing ring; an outer diameter of the distal end is smaller than that of the proximal end.

3. The water purification bottle according to claim 1, wherein the filter component further comprises a primary filter component and a secondary filter component; the primary filter component is located on the proximal end; the secondary filter component is located on the distal end; the primary filter component and the secondary filter component are arranged at intervals forming a filter cavity inside the barrel structure.

4. The water purification bottle according to claim 3, wherein the primary filter component comprises a primary ultrafiltration membrane, a carbon fiber and a primary filter cotton; the carbon fiber is arranged between the primary ultrafiltration membrane and the primary filter cotton.

5. The water purification bottle according to claim 3, wherein the secondary filter component comprises a secondary ultrafiltration membrane and a secondary filter cotton; the secondary ultrafiltration membrane is arranged below the secondary filter cotton.

6. The water purification bottle according to claim 3, wherein a proximal strainer is arranged on the proximal end of the barrel structure; a distal strainer is arranged below the distal end of the barrel structure; the primary filter component and the secondary filter component are arranged between the proximal strainer and the distal strainer; the proximal end and the distal end of the barrel structure are respectively provided with an annular groove; an outer periphery of the proximal strainer and the distal strainer is respectively provided with an annular protrusion; the annular protrusion can embed into the annular groove.

7. The water purification bottle according to claim 1, wherein at least one venthole is arranged at the bottom end of the outer bottle body; a valve stem is arranged inside the venthole; the venthole and the valve stem together work as a one-way valve; outside air flows into the outer bottle body through the venthole.

8. The water purification bottle according to claim 1, further comprising a sealing gasket; the bottle cap component is arranged on a top end of the inner bottle body; the sealing gasket is sleeved around the periphery of the inner bottle body; when the inner bottle body is inserted into the outer bottle body, the sealing gasket is located between the bottle cap component and an top end of the outer bottle body.

9. The water purification bottle according to claim 8, wherein the bottle cap body is provided with a drinking mouth in communication with the inner bottle body; the flip-up lid is rotatable relative to the bottle cap body to close or open the drinking mouth.

* * * * *